(12) United States Patent
Ghadyani

(10) Patent No.: US 9,610,519 B2
(45) Date of Patent: Apr. 4, 2017

(54) APPARATUS AND METHOD FOR AUTOMATIC DECANTATION OF MULTI-PHASE CHEMICAL FLUID

(71) Applicant: Mohammad Ghadyani, Tehran (IR)

(72) Inventor: Mohammad Ghadyani, Tehran (IR)

( * ) Notice: Subject to any disclaimer, the term of this patent is extended or adjusted under 35 U.S.C. 154(b) by 0 days.

(21) Appl. No.: 15/257,777

(22) Filed: Sep. 6, 2016

(65) Prior Publication Data

US 2016/0367913 A1  Dec. 22, 2016

(51) Int. Cl.
| | | |
|---|---|---|
| *B01D 17/12* | (2006.01) | |
| *B01D 21/24* | (2006.01) | |
| *B01D 21/30* | (2006.01) | |
| *B01L 3/00* | (2006.01) | |
| *B67C 11/06* | (2006.01) | |
| *B01D 17/02* | (2006.01) | |
| *E02B 15/04* | (2006.01) | |
| *B63B 35/32* | (2006.01) | |

(52) U.S. Cl.
CPC ......... *B01D 17/0214* (2013.01); *B01D 17/12* (2013.01); *B01D 21/2444* (2013.01); *B01D 21/302* (2013.01); *B01L 3/567* (2013.01); *B63B 35/32* (2013.01); *B67C 11/06* (2013.01); *E02B 15/045* (2013.01)

(58) Field of Classification Search
CPC ........ B01D 17/02; B01D 17/12; B01D 21/24; B01D 21/2444; B01D 21/30; B01D 21/302; B01D 21/307; B01D 21/34; B01D 17/0214; C02F 1/008; C02F 1/40; C02F 2103/007; C02F 2201/005; C02F 2209/01; C02F 2209/09; C02F 2209/42; C02F 2209/44; G01N 2035/00465; E02B 15/045; B63B 35/32; B01C 3/02; B01C 3/0203; B01C 3/08; B01C 3/56; B01C 3/567; B67C 11/00; B67C 11/04; B67C 11/06; B67C 2011/40; B67C 2300/04
USPC ......... 210/86, 114, 115, 123, 513, 744, 800, 210/533, 534, 540, 138, 257.1; 422/533, 422/99; 141/198, 199, 202, 210, 331, 343
See application file for complete search history.

(56) References Cited

U.S. PATENT DOCUMENTS

| | | | | |
|---|---|---|---|---|
| 1,462,257 A | * | 7/1923 | Brock | .................... A45D 33/34 15/229.14 |
| 1,907,001 A | * | 5/1933 | Peter | ...................... B65D 90/38 200/84 R |
| 2,413,509 A | * | 12/1946 | Lord | .................. B01D 17/0214 210/104 |

(Continued)

*Primary Examiner* — Joseph Drodge
(74) *Attorney, Agent, or Firm* — Barry Choobin; Patent 360

(57) ABSTRACT

An apparatus for automated decantation of a multi-phase fluid mixture comprising a decantation container, a floating marker, a sensor, a plurality of engines and a plurality of micro-switches. The decantation container comprises an inlet valve and at-least two outlet valves. The floating marker is housed within the decantation container. The floating marker is of a selective density. The sensor is attached at a bottom surface of the decantation container. The plurality of engines are connected with the sensor. The plurality of engines controls an opening and a closing of the at-least two outlet valves. The plurality of micro-switches are connected to the plurality of engines. The plurality of micro-switches control an amount of power supplied to the plurality of engines.

17 Claims, 4 Drawing Sheets

(56) References Cited

U.S. PATENT DOCUMENTS

| | | | | |
|---|---|---|---|---|
| 3,165,466 A * | 1/1965 | Vantrain | ............ | B01D 21/2472 |
| | | | | 210/114 |
| 3,415,380 A * | 12/1968 | Ellis | ...................... | B01L 3/0203 |
| | | | | 210/202 |
| 3,713,778 A * | 1/1973 | Karamian | ............... | B01L 3/569 |
| | | | | 210/535 |
| 3,868,321 A * | 2/1975 | Gough | ............... | B01D 17/0214 |
| | | | | 210/115 |
| 3,929,411 A * | 12/1975 | Takano | ............... | G01N 35/1097 |
| | | | | 137/572 |
| 4,025,311 A * | 5/1977 | Bochinski | .............. | G01N 35/00 |
| | | | | 222/373 |
| 4,160,727 A * | 7/1979 | Harris, Jr. | ............ | B01D 61/022 |
| | | | | 210/140 |
| 4,521,312 A * | 6/1985 | Anderson | .......... | B01D 17/0214 |
| | | | | 210/119 |
| 4,908,127 A * | 3/1990 | Metais | .................... | E02B 15/06 |
| | | | | 210/123 |
| 5,108,591 A * | 4/1992 | Hagan | .................... | E02B 15/106 |
| | | | | 210/104 |
| 5,478,478 A * | 12/1995 | Griswold | ................ | B01L 3/569 |
| | | | | 141/333 |
| 5,679,258 A * | 10/1997 | Petersen | ................ | B01D 17/12 |
| | | | | 210/104 |
| 6,092,547 A * | 7/2000 | Komiya | .................. | E03C 1/298 |
| | | | | 137/192 |
| 6,368,498 B1 * | 4/2002 | Guilmette | .......... | B01D 17/0208 |
| | | | | 137/172 |

* cited by examiner

APPARATUS AND METHOD FOR AUTOMATIC DECANTATION OF MULTI-PHASE CHEMICAL FLUID

BACKGROUND

Technical Field of Invention

The embodiments herein generally relate to an apparatus for fluid separation and particularly relate to an apparatus and a method for automated fluid decantation on a basis of the gravity of fluids in a fluid mixture. The embodiments herein more particularly relate to an apparatus and a method for automatic decantation of a multi-phase fluid with simultaneous separation of each phase on the basis of their gravity.

Description of Related Art

A decantation, also known as separation funnel is a piece of laboratory glassware used in liquid-liquid extractions to separate the components of a mixture into two or more phases on the basis of densities of the liquid. To use a separation funnel, the mixture to be separated is added through the top with a stopcock for closing a bottom opening. A top and a bottom tap are then opened and the lower phase is released by gravitation. A top opening must be opened while releasing a lower phase to allow pressure equalization between the inside of the funnel and the atmosphere. When the lower layer phase is removed, the stopcock is closed and an upper layer phase is poured out through the top into another container. The same method is used for industrial purposes but the containers are in large scale. The other industrial way is to use a centrifuge machine which separates the phases in high accuracy but the centrifuge machine needs too much energy and is generally too expensive.

The most important use of large scale separation of the immiscible liquids is for collecting and separating oil spills from high seas. For an oil spill on a surface of water, it is surrounded by a collection boom in order to prevent spreading, then one of the following common ways are used to separate oil spills:

1) A first way, most common in nature, is to burn the spill before spreading and polluting the water. This annihilates the oil but causes large amount of pollution for the environment.
2) The second way is to use the natural and artificial absorbents. The natural absorbents such as feather and wood chips and the artificial absorbents such as poly ethylene and nylon, burn with the oil.
3) The third way is to use absorbent skimmers but because of being expensive and least outcome, aren't used most of the time. From whirring disks to floating drums, the absorbent skimmers work by removing an oil layer from the surface of the water. These devices attract oil to their surfaces before transferring it to a collection tank, often fitted on a boat which is method is highly time consuming.
4) The fourth way is to use the chemical dispersants. Releasing the chemical dispersants on an oil slick breaks down the oil into smaller droplets, allowing them to mix more easily into the water column but due to presence of droplets of oil, the water gets polluted.

Thus in the view of foregoing, there is a need for an apparatus and method to provide a large scale separation of fluid mixtures without polluting water or air. Also there is a need for an apparatus and method for automated decantation of a multi-phase fluid using gravity separation technique. Further there is a need for an apparatus and a method for detection of density wise disposal of each fluid phase in a multi-phase fluid mixture and thus initiating a disposal or collection of next phase having lower density than earlier disposed phase.

The above mentioned shortcomings, disadvantages and problems are addressed herein, as detailed below.

SUMMARY OF THE INVENTION

The primary object of the embodiments herein is to provide an apparatus and method to provide a large scale separation of fluid mixtures without polluting water or air.

Another object of the embodiments herein is to provide an apparatus and method for automated decantation of a multi-phase fluid using gravity separation technique.

Yet another object of the present invention is to provide an apparatus and a method for detection of density wise disposal of each fluid phase in the multi-phase fluid mixture and thus initiating a disposal or collection of next phase having lower density than earlier disposed phase.

The various embodiments herein provide an apparatus for automated decantation of a multi-phase fluid mixture. The apparatus comprises a decantation container, a floating marker, a sensor, a plurality of engines and a plurality of micro-switches. The decantation container comprises an inlet valve and at-least two outlet valves. The floating marker is housed within the decantation container. The floating marker is of a selective density. The sensor is attached at a bottom surface of the decantation container. The plurality of engines are connected with the sensor. The plurality of engines controls an opening and a closing of the at-least two outlet valves. The plurality of micro-switches are connected to the plurality of engines. The plurality of micro-switches control an amount of power supplied to the plurality of engines.

According to one embodiment herein, the at-least two outlet valves are present at vertically displaced positions on the surface of the decantation container. An outlet valve for a fluid with higher density is present at the bottom of the decantation container and is referred as a first outlet valve and the outlet valve for a fluid with lower density is present vertically above the first outlet valve and is referred as a second outlet valve.

According to one embodiment herein, the selective density of the float marker is selected on the basis of densities of the fluids in the multi-phase fluid mixture. The selective density of the float marker is selected between the density values of the fluids in the multi-phase fluid mixture.

According to one embodiment herein, the sensor is electromagnetic in nature.

According to one embodiment herein, the float marker is alternatively electromagnetic or non-electromagnetic depending on the basis multi-phase fluid mixture.

According to one embodiment herein, the plurality of engines comprises a first engine connected with a first outlet valve present at a bottom surface of the decantation container and a second engine connected with a second outlet valve present vertically above the first outlet valve of the decantation container.

According to one embodiment herein, the sensor activates the first engine after separation of the layers in the decantation container. The activation of the first engine results in disposal and storage of the fluid with higher density.

According to one embodiment herein, the sensor activates the second engine as the float marker reaches in line with the sensor. The activation of the second engine results in disposal and storage of the fluid with lower density.

According to one embodiment herein, the fluid in the multi-phase fluid mixture are immiscible in nature.

According to one embodiment herein, the apparatus separates two and more immiscible fluids in a single decantation cycle. The decantation cycle or decantation time is a time to separate and dispose all the fluids of different densities present in the multi-phase fluid mixture.

The embodiments herein provide a method for automated decantation of a multi-phase fluid mixture comprising the steps of
  a) detecting a filling of a decantation container with the multi-phase fluid mixture through a sensor;
  b) activating a first engine after an stay period. The stay period is a maximum time for separation of the multi-phase mixture into individual fluids on the basis of density. The activation of the first engine results in opening of a first outlet valve present at a bottom surface of the decantation container;
  c) disposing and collecting the fluid with higher density through the first outlet valve into a first storage tank;
  d) detecting a position of a float marker placed inside the decantation container;
  e) stopping the first engine, closing the first outlet valve and activating a second engine during an in line position of the float marker with respect to the sensor. The activation of the second engine results in opening of a second outlet valve present vertically above the first outlet valve;
  f) disposing and collecting the fluid with lower density through the second outlet valve into a second storage tank.

According to one embodiment herein, the float marker is of selective density. The selective density of the float marker is selected on the basis of densities of the fluids in the multi-phase fluid mixture. The selective density of the float marker is selected between the density values of the fluids in the multi-phase fluid.

According to one embodiment herein, the first engine and the second engine are connected with a plurality of micro-switches. The plurality of micro-switches control a pumping power of the first engine and the second engine according to density and viscosity of the fluid.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The other objects, features and advantages will occur to those skilled in the art from the following description of the preferred embodiment and the accompanying drawings in which.

DETAILED DESCRIPTION OF THE DRAWINGS

In the following detailed description, a reference is made to the accompanying drawings that form a part hereof, and in which the specific embodiments that may be practiced is shown by way of illustration. The embodiments are described in sufficient detail to enable those skilled in the art to practice the embodiments and it is to be understood that the logical, mechanical and other changes may be made without departing from the scope of the embodiments. The following detailed description is therefore not to be taken in a limiting sense.

Figure 1:
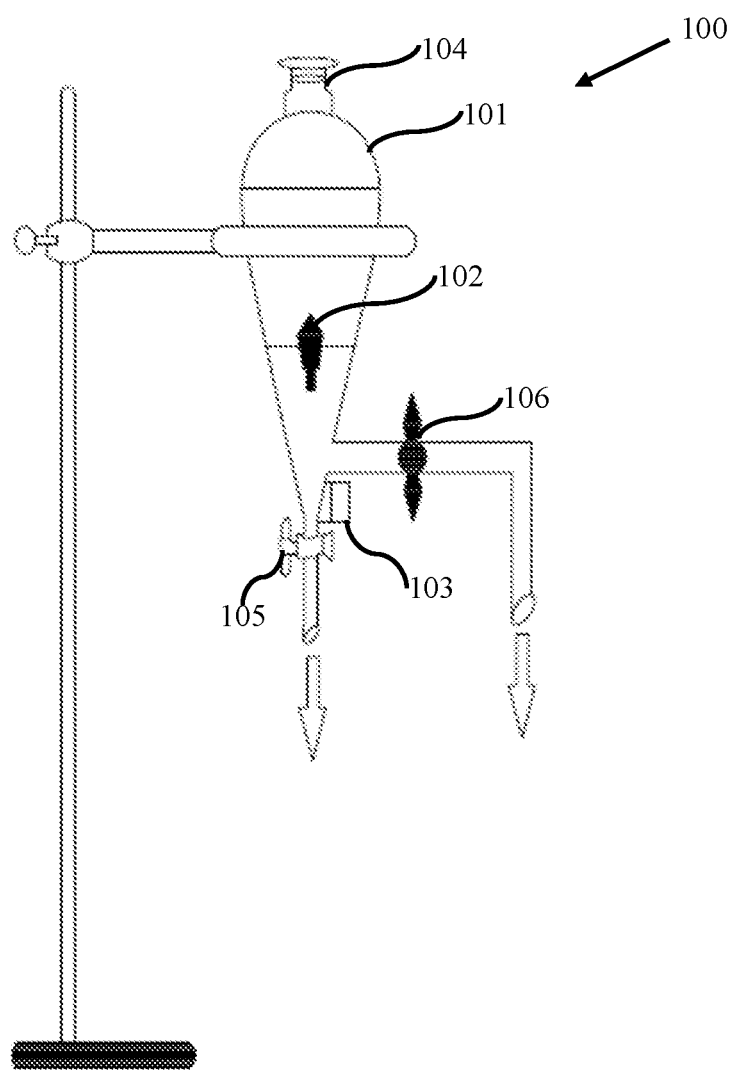
FIG. 1 illustrates a portable apparatus for automated decantation of a multi-phase fluid mixture, according to one embodiment herein.

FIG. 1 illustrates a portable apparatus for automated decantation of a multi-phase fluid mixture, according to one embodiment herein. With respect to FIG. 1, the apparatus 100 for automated decantation of a multi-phase fluid mixture comprises a decantation container 101, a floating marker 102, a sensor 103, a plurality of engines (not shown) and a plurality of micro-switches (not shown). The decantation container 101 comprises an inlet valve 104 and at-least two outlet valves (105 & 106). The floating marker 102 is housed within the decantation container 101. The floating marker 102 is of a selective density. The sensor is attached at a bottom surface of the decantation container 101. The plurality of engines are connected with the sensor. The plurality of engines controls an opening and a closing of the at-least two outlet valves (105 & 106). The plurality of micro-switches are connected to the plurality of engines. The plurality of micro-switches control an amount of power supplied to the plurality of engines.

Figure 2:
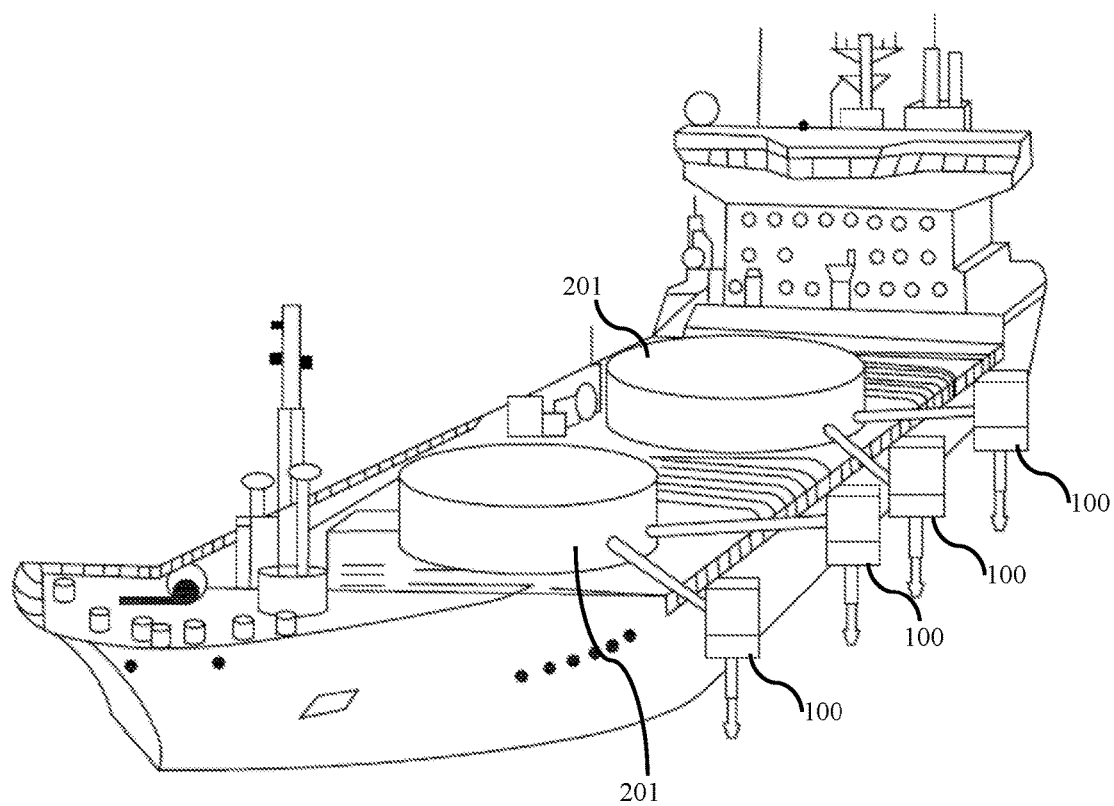
FIG. 2 illustrates a ship based apparatus for automated decantation of a multi-phase fluid mixture, according to one embodiment herein.

FIG. 2 illustrates a ship based apparatus for automated decantation of a multi-phase fluid mixture, according to one embodiment herein. With respect to FIG. 2, the automated decantation apparatus 100 is large in size and used for real time decantation for an oil or any harmful fluid spill in water. The ship based decantation apparatus 100 houses a fluid sensor and automatically detects a fluid or oil spill over the water. On detection, a pump is initiated to transfer the water and spilled fluid mixture in a target area, into the decantation container through the inlet valve. The pump is connected to the inlet valve through a hose. After filling of the decantation container, the pumping process stop for a stay time (ST). After decantation, the water is poured back into the water body (river, pond, lake, ocean or sea) and the spilled fluid is taken out of the second outlet valve to a storage tank 201 provided on the ship.

Figure 3:
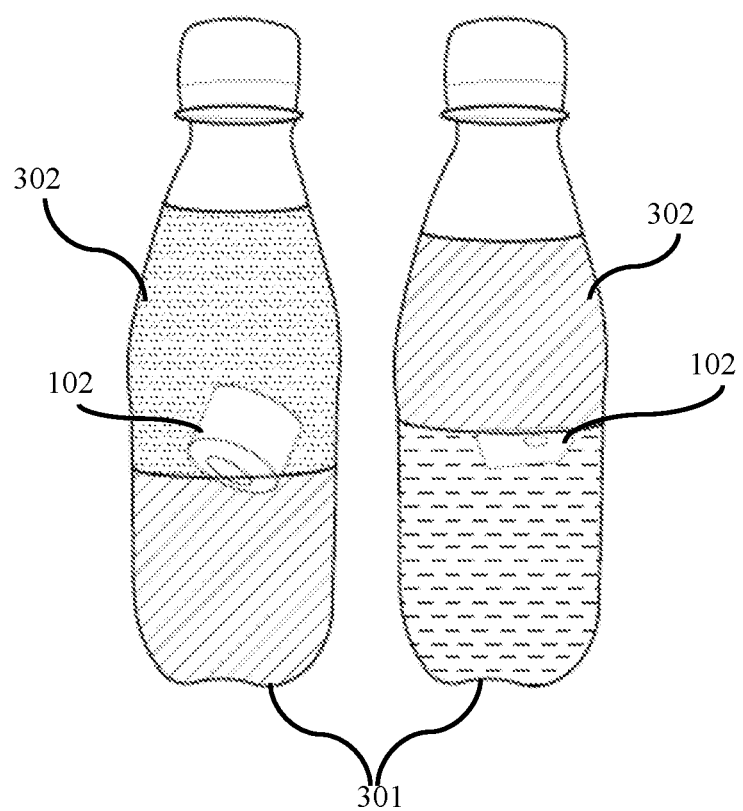
FIG. 3 illustrates an exemplary float marker in between two separate fluids, according to one embodiment herein.

FIG. 3 illustrates an exemplary float marker in between two separate fluids, according to one embodiment herein. With respect to FIG. 3, the selective density of the float marker 102 is selected on the basis of densities of the fluids (301 & 302) in the multi-phase fluid mixture. The selective density of the float marker is selected between the density values of the fluids in the multi-phase fluid. The float marker 102 is alternatively electromagnetic or non-electromagnetic in nature depending on the basis multi-phase fluid mixture.

According to one embodiment herein, the at-least two outlet valves are present at vertically displaced positions on the surface of the decantation container. An outlet valve for a fluid with higher density is present at the bottom of the decantation container and is referred as a first outlet valve and the outlet valve for a fluid with lower density is present vertically above the first outlet valve and is referred as a second outlet valve.

According to one embodiment herein, the sensor is electromagnetic in nature.

According to one embodiment herein, the plurality of engines comprises a first engine connected with a first outlet valve present at a bottom surface of the decantation container and a second engine connected with a second outlet valve present vertically above the first outlet valve of the decantation container.

According to one embodiment herein, the sensor activates the first engine after separation of the layers in the decantation container. The activation of the first engine results in disposal and storage of the fluid with higher density.

According to one embodiment herein, the sensor activates the second engine as the float marker reaches in line with the sensor. The activation of the second engine results in disposal and storage of the fluid with lower density.

According to one embodiment herein, the fluid in the multi-phase fluid mixture are immiscible in nature.

According to one embodiment herein, the apparatus separates two and more immiscible fluids in a single decantation cycle. The decantation cycle or decantation time is a time to separate and dispose all the fluids of different densities present in the multi-phase fluid mixture.

Figure 4:
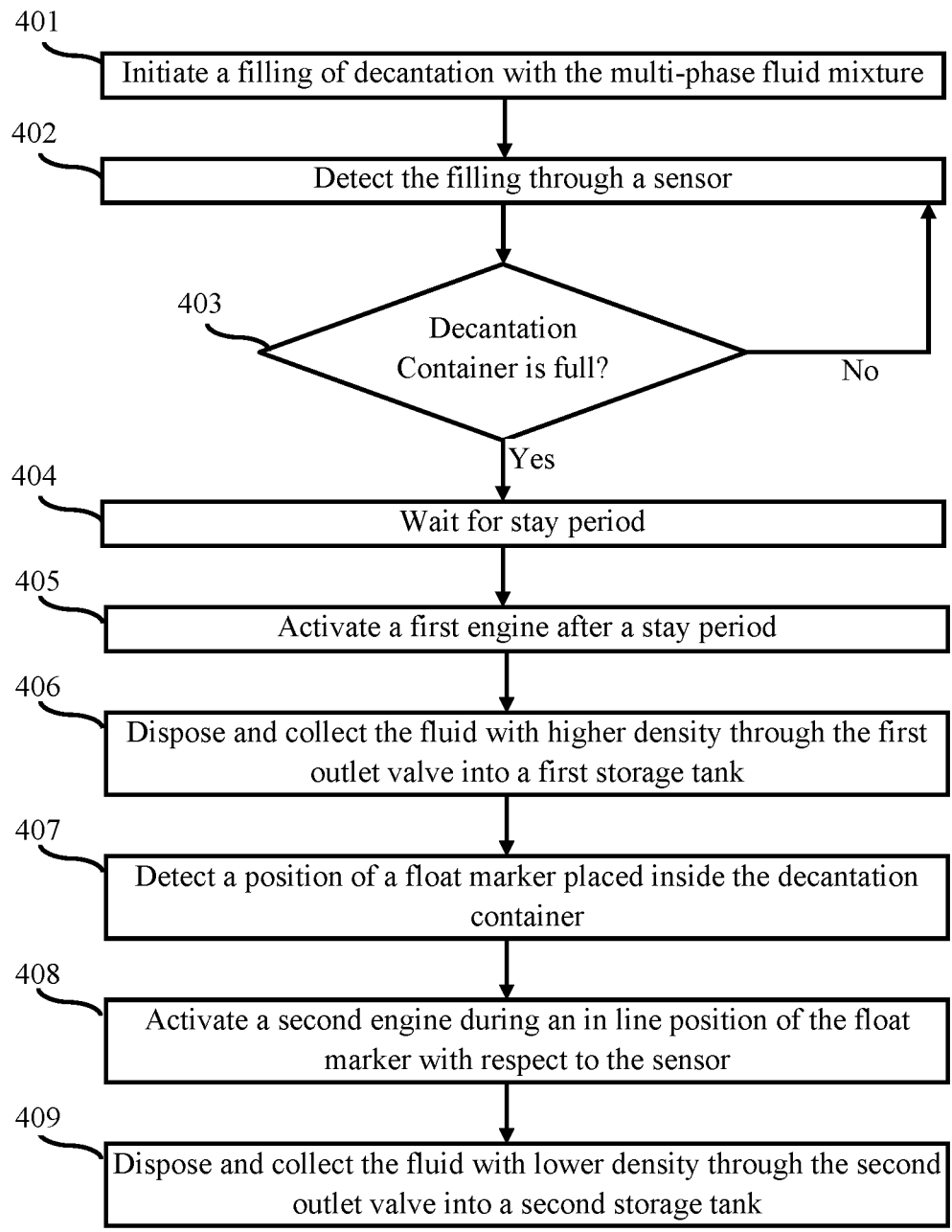
FIG. 4 illustrates a flowchart of a method for automated decantation of a multi-phase fluid mixture, according to one embodiment herein.

FIG. 4 illustrates a flowchart of a method for automated decantation of a multi-phase fluid mixture, according to one embodiment herein. The method comprises the steps of:
a) Initiating a filling of decantation with the multi-phase fluid mixture (401);
b) Detecting the filling of a decantation container with the multi-phase fluid mixture through a sensor (402);
c) Check whether the decantation container is filled upto predetermined limit (403). On filling of the decantation container, wait for a stay period/time (ST) (404).
d) Activating a first engine after a stay period (405). The stay period is maximum time for separation of the multi-phase mixture into individual fluids on the basis of density. The activation of the first engine results in opening of a first outlet valve present at a bottom surface of the decantation container;
e) Disposing and collecting the fluid with higher density through the first outlet valve into a first storage tank (406);
f) Detecting a position of a float marker placed inside the decantation container (407);
g) Stopping the first engine, closing the first outlet valve and activating a second engine during an in line position of the float marker with respect to the sensor (408). The activation of the second engine results in opening of a second outlet valve present vertically above the first outlet valve;
h) Disposing and collecting the fluid with lower density through the second outlet valve into a second storage tank (409).

According to one embodiment herein, the float marker is of selective density. The selective density of the float marker is selected on the basis of densities of the fluids in the multi-phase fluid mixture. The selective density of the float marker is selected between the density values of the fluids in the multi-phase fluid.

According to one embodiment herein, the first engine and the second engine are connected with a plurality of micro-switches. The plurality of micro-switches control a pumping power of the first engine and the second engine according to density and viscosity of the fluid.

The apparatus includes at-least two taps (outlet valves), one for transferring the fluid phase with more density (such as aqueous phase) and one for transferring the fluid phase with less density (such as oily phase). Further the machine includes a float marker which exactly floats in the boundary between two different phases. Based on density, the fluid with less density stays at the top and the fluid with more density settles down. The oily phase has less density than the aqueous phase and based on the difference in density and their type of bond they can't merge together. The density of liquids is the base for making the float.

The density of float marker is more than the density of the phase with less density and is less than the density of the phase with more density, so it floats on the phase with more density and the phase with less density float above the float marker.

Sample of the float's calculation for two phase solution of water and oil:

$$d=m/v \text{ aqueous phase} \leftarrow d>d \rightarrow \text{oily phase}$$

$$\text{oily phase } d<d \text{ float}<d \text{ aqueous phase}$$

The way to calculate float's density is exactly the same as this equation and the float's density should be something between the densities of two phases.

The fluid mixture is poured in the decantation container and after a short time, which is called stay time, it becomes stable and phases are separated completely. The float is in the funnel too. There are separate engines for each tap which are automatic. Turning on the apparatus results into initiation of transfer of the phase with more density, and then the float comes in line to the sensor resulting in turning-off the first tap automatically and the second tap is turned on to transfer the phase with less density.

The present decantation apparatus separates multi-phase liquid fluids automatically and at low cost without consuming energy. The present decantation apparatus is suitable for industrial usage requiring separation of large volume of multi-phase fluid. The present apparatus further finds huge application in purification and separation of multi-phase sullage and oil spills from high seas.

It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the claims.

I claim:
1. An apparatus for automated decantation of a multi-phase fluid mixture comprising:
a decantation container, wherein the decantation container comprises an inlet valve and at-least two outlet valves;
a floating marker, wherein the floating marker is housed within the decantation container, wherein the floating marker is of a selective density;
a sensor, wherein the sensor is attached at a bottom surface of the decantation container;
a plurality of engines, wherein the plurality of engines are connected with the sensor, wherein each engine controls an opening and a closing of the at-least one outlet valve;
a plurality of micro-switches, wherein each micro-switch is connected to at-least one engine, wherein each micro-switch controls an amount of power supplied to at-least one engine.

2. The apparatus according to claim 1, wherein the at-least two outlet valves are present at vertically displaced positions on a surface of the decantation container, wherein an outlet valve for a fluid with higher density is present at the bottom of the decantation container and is referred as a first outlet valve, and the outlet valve for a fluid with lower density is present vertically above the first outlet valve and is referred as a second outlet valve.

3. The apparatus according to claim 1, wherein the selective density of the float marker is selected on the basis of densities of two fluids in the multi-phase fluid mixture, wherein the selective density of the float marker is selected between the density values of two fluids in the multi-phase fluid.

4. The apparatus according to claim 1, wherein the sensor is electromagnetic in nature.

5. The apparatus according to claim 1, wherein the float marker is electromagnetic in nature.

6. The apparatus according to claim 1, wherein the plurality of engines comprises a first engine connected with a first outlet valve present at a bottom surface of the decantation container and a second engine connected with a second outlet valve present vertically above the first outlet valve of the decantation container.

7. The apparatus according to claim 6, wherein the sensor activates the first engine after separation of fluid mixture into layers in the decantation container, wherein the activation of the first engine results in disposal and storage of the fluid with higher density.

8. The apparatus according to claim 6, wherein the sensor activates the second engine as the float marker reaches in line with the sensor, wherein the activation of the second engine results in disposal and storage of the fluid with lower density.

9. The apparatus as according to claim 1, wherein the fluid in the multi-phase fluid mixture are immiscible in nature.

10. The apparatus according to claim 1 separates two or more immiscible fluids in a single decantation cycle, wherein the decantation cycle is a time to separate and dispose all the fluids of different densities present in the multi-phase fluid mixture.

11. A method for automated decantation of a multi-phase fluid mixture comprising the steps of:

detecting a filling of a decantation container with the multi-phase fluid mixture through a sensor;

activating a first engine after a stay period, wherein the stay period is maximum time for separation of the multi-phase mixture into individual fluids on the basis of density, wherein the activation of the first engine results in opening of a first outlet valve present at a bottom surface of the decantation container;

disposing and collecting the fluid with higher density through the first outlet valve into a first storage tank;

detecting a position of a float marker placed inside the decantation container;

stopping the first engine, closing the first outlet valve and activating a second engine during an in line position of the float marker with respect to the sensor, wherein the activation of the second engine results in opening of a second outlet valve present vertically above the first outlet valve;

disposing and collecting the fluid with lower density through the second outlet valve into a second storage tank.

12. The method according to claim 11, wherein the float marker is of selective density, wherein the selective density of the float marker is selected on the basis of densities of the two fluids in the multi-phase fluid mixture, wherein the selective density of the float marker is selected between the density values of the fluids in the multi-phase fluid.

13. The method according to claim 11, wherein the sensor is electromagnetic in nature.

14. The method according to claim 11, wherein the float marker is electromagnetic in nature.

15. The method according to claim 11, wherein at-least two immiscible fluids are separated in a single decantation cycle, wherein the decantation cycle is a time to separate and dispose all the fluids of different densities present in the multi-phase fluid mixture.

16. The method according to claim 11, wherein each of the first engine and the second engine is connected with at-least one micro-switch.

17. The method according to claim 16, wherein at-least one micro-switch controls pumping power of the first engine and the second engine respectively according to density and viscosity of the fluid.

* * * * *